United States Patent [19]

Tsunoda et al.

[11] Patent Number: 5,789,331
[45] Date of Patent: Aug. 4, 1998

[54] METHOD FOR PARTIALLY DEALUMINATING A ZEOLITE CATALYST

[75] Inventors: Takashi Tsunoda, Kurashiki; Kazuyoshi Kiyama, Yokohama; Masatsugu Kawase, Kurashiki, all of Japan

[73] Assignee: Sanyo Petrochemical Co., Ltd., Tokyo, Japan

[21] Appl. No.: 888,704

[22] Filed: Jul. 7, 1997

Related U.S. Application Data

[63] Continuation of Ser. No. 411,681, filed as PCT/JP94/01646, abandoned.

[30] Foreign Application Priority Data

Sep. 30, 1993 [JP] Japan .................................. 5-265498

[51] Int. Cl.$^6$ ........................................ B01J 29/06
[52] U.S. Cl. ........................ 502/71; 502/64; 502/66; 502/73; 502/74; 502/77; 502/85
[58] Field of Search ..................... 502/64, 66, 71, 502/73, 74, 77, 85

[56] References Cited

U.S. PATENT DOCUMENTS

| | | | |
|---|---|---|---|
| 3,756,942 | 9/1973 | Cattanach et al. | |
| 4,429,176 | 1/1984 | Chester | 585/481 |
| 4,522,929 | 6/1985 | Chester | 502/77 |
| 4,594,146 | 6/1986 | Chester | 208/111 |
| 4,663,492 | 5/1987 | Chester | 585/408 |
| 5,192,727 | 3/1993 | Nair et al. | |
| 5,236,880 | 8/1993 | Chapman | 502/74 |
| 5,268,162 | 12/1993 | Ishida et al. | |
| 5,348,924 | 9/1994 | Potter et al. | 502/66 |

FOREIGN PATENT DOCUMENTS

| | | |
|---|---|---|
| 0172686 | 2/1986 | European Pat. Off. . |
| 0350367 | 1/1990 | European Pat. Off. . |
| 60-153944 | 8/1985 | Japan . |
| 60-156793 | 8/1985 | Japan . |
| 63-14732 | 1/1988 | Japan . |
| 2-115135 | 4/1990 | Japan . |
| 9302994 | 2/1993 | WIPO . |

*Primary Examiner*—Michael Lewis
*Assistant Examiner*—Thomas G. Dunn, Jr.
*Attorney, Agent, or Firm*—Birch, Stewart, Kolasch & Birch, LLP

[57] ABSTRACT

A method for partially dealuminating a zeolite catalyst by steaming, which comprises feeding steam to and flowing the steam through a reactor containing a catalyst bed of a zeolite catalyst to contact the zeolite catalyst with the steam for 0.1 to 50 hours under temperature distribution conditions which satisfies the following requirements (1) and (2):

(1) 500° C.$\leq T_0 \leq T \leq T_2 \leq$700° C. wherein $T_0$ is the temperature (°C.) of the fed steam; $T_2$ is the maximum temperature (°C.) of the catalyst bed; and T is the average temperature (°C.) of the catalyst bed, which is defined by the formula:

$$T = \sum_{i=1}^{n} T_i/n,$$

wherein $T_i$ is the time average temperature (°C.) of the i-th block of n equilength blocks of the catalyst bed, which are arranged along the direction of steam flow; and (2) cv(T)×1000$\leq$10 wherein cv(T) is the coefficient of variation of the time average temperature, which is represented by the formula: cv(T)=s(T)/T, wherein s(T) is the standard deviation of the time average temperature, which is obtained from s(T)$^2$ which is the variance of the time average temperature and defined by the formula:

$$s(T)^2 = \sum_{i=1}^{n} (T_i - T)^2/n,$$

wherein T and Ti are as defined above. By the method of the present invention, there can be obtained a zeolite catalyst having a uniform activity which can be stably maintained in a subsequent reaction using the steamed zeolite catalyst for a long period of time.

14 Claims, 3 Drawing Sheets

Average temperature (T) of catalyst bed = Space average value of time average temperature distribution Reactor Condenser 5,789,331

1

METHOD FOR PARTIALLY DEALUMINATING A ZEOLITE CATALYST

This application is a continuation of application Ser. No. 08/411,681, filed as PCT/JP94/01646 Sep. 30, 1994, now abandoned.

BACKGROUND OF THE INVENTION

1. Field of the Invention

The present invention relates to a method for partially dealuminating a zeolite catalyst comprising a zeolite by steaming. More particularly, the present invention is concerned with a method for partially dealuminating a zeolite catalyst by steaming, which comprises contacting a zeolite catalyst comprising a zeolite with steam under specific temperature distribution conditions to uniformly, partially dealuminate the zeolite. The method of the present invention is useful for improving the stability, especially the catalytic activity stability, of the zeolite catalyst which is widely used in the fields of petrochemistry and petroleum refining.

2. Discussion of Related Art

It is known that a catalyst comprising a zeolite can be subjected to steaming to improve the stability thereof. For example, Unexamined Japanese Patent Application Laid-Open Specification No. 60-153944/1985 (corresponding to U.S. Pat. No. 4,429,176) discloses a method for stabilizing a zeolite catalyst, in which a fresh zeolite catalyst is steamed under conditions such that the steamed zeolite catalyst retains 25% or more of the initial activity of the fresh zeolite catalyst, that is, under low temperature conditions. Unexamined Japanese Patent Application Laid-Open Specification No. 63-14732/1988 discloses that when a ZSM-5 type zeolite catalyst is heat-treated at 600° to 800° C. for 0.2 to 20 hours under a steam partial pressure of 0.1 to 1 atm, a lowering of the catalytic activity with time in the subsequent reaction using the steamed catalyst, due to the accumulation of a coke-like substance on the surface of the catalyst, is suppressed, so that the stability of the catalyst is improved. Unexamined Japanese Patent Application Laid-Open Specification No. 2-115134/1990 discloses that when a catalyst comprising a crystalline aluminosilicate, a Zn component and alumina is steamed at 500° to 800° C. for 0.1 to 50 hours under a steam partial pressure of 0.1 to 10 kg/cm², the Zn in the catalyst is stabilized, so that the evaporation loss of Zn from the steamed catalyst in the subsequent reactions using the steamed catalyst can be considerably decreased. Unexamined Japanese Patent Application Laid-Open Specification No. 60-156793/1985 discloses that when an aluminosilicate catalyst for use in production of an aromatic hydrocarbon from a hydrocarbon material comprising a $C_2$–$C_4$ hydrocarbon is steamed, although the initial activity of the steamed catalyst is slightly lowered as compared to the fresh, unsteamed catalyst, the deposition of carbon on the surface of the catalyst during the subsequent reaction using the steamed catalyst can be significantly reduced.

However, when a zeolite catalyst is steamed according to the conventional methods as mentioned above, problems occur. For example, when a zeolite catalyst is steamed having a low temperature as described in the Working Examples of Unexamined Japanese Patent Application Laid-Open Specification No. 60-153944/1985, a non-uniform temperature distribution is experienced in the catalyst bed due to the reaction heat generated, so that uniform steaming conditions cannot be maintained. On the other hand, in the case of the method in which a zeolite catalyst is treated with steam having a high temperature as described in Unexam-

2 ined Japanese Patent Application Laid-Open Specification No. 63-14732/1988, a partial dealumination of the zeolite catalyst cannot be stably and uniformly performed on a commercial scale. Thus, a solution to the above-mentioned problems of the prior art has been strongly desired.

SUMMARY OF THE INVENTION

The present inventors have made extensive and intensive studies with a view toward solving the above-mentioned problems of the prior art, and have developed a method for partially dealuminating a zeolite catalyst, which can be stably and uniformly practiced on a commercial scale. As a result, it has unexpectedly been found that when a catalyst bed of a zeolite catalyst comprising a zeolite is subjected to steaming in a reactor under specific temperature distribution conditions, the zeolite of the catalyst bed is uniformly, partially dealuminated to produce an improved zeolite catalyst having a stabilized and uniform activity. The present invention has been completed, based on the above finding.

Therefore, it is an object of the present invention to provide a method for uniformly, partially dealuminating the zeolite of a zeolite catalyst to produce an improved zeolite catalyst having a stabilized and uniform activity.

It is another object of the present invention to provide a method for effectively, efficiently and easily conducting the above-mentioned uniform partial dealumination of the zeolite of a zeolite catalyst.

The foregoing and other objects, features and advantages of the present invention will be apparent from the following detailed description and claims taken in connection with the accompanying drawings.

DETAILED DESCRIPTION OF THE INVENTION

Figure 1:
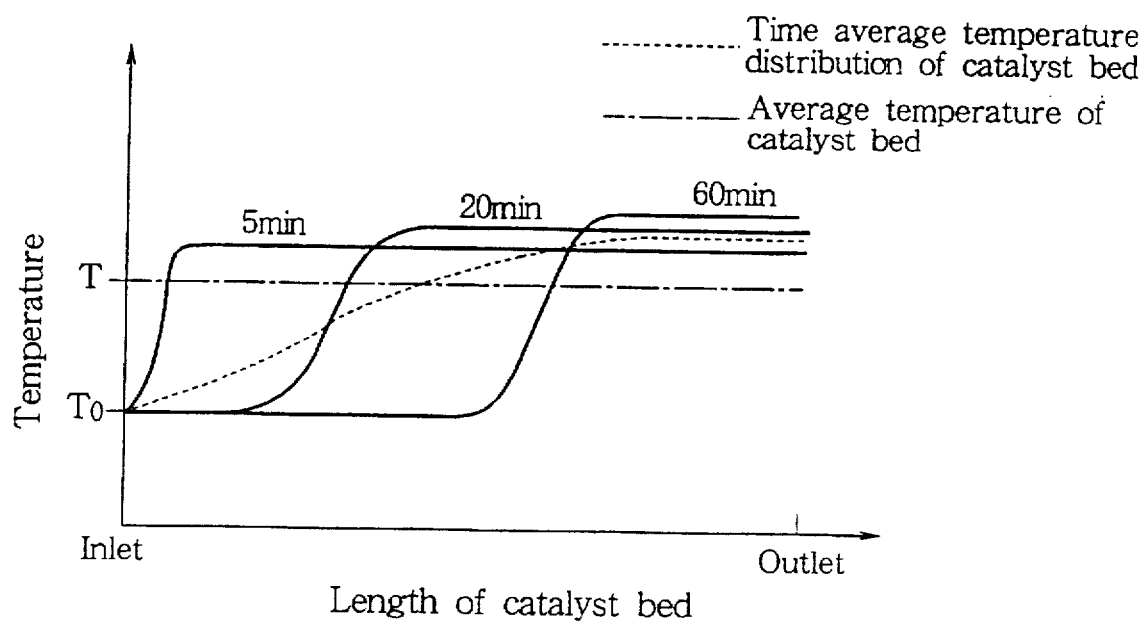
FIG. 1 is a diagram showing one example of the temperature distribution in a catalyst bed comprising a zeolite catalyst during the steaming according to the method of the present invention, shown together with non-uniform temperature distribution.

Essentially, according to the present invention, there is provided a method for partially dealuminating a zeolite catalyst by steaming to produce an improved zeolite catalyst having a stabilized activity, which comprises:

charging a reactor with a zeolite catalyst comprising a zeolite having an Si/Al atomic ratio of from 2 to 60 in a zeolite structure thereof to provide a catalyst bed in the reactor; and feeding steam to and flowing the steam through the reactor to contact the zeolite catalyst of the catalyst bed with the steam for 0.1 to 50 hours under temperature distribution conditions which satisfy the following requirements (1) and (2);

(1) $500°\text{C.} \leq T_0 \leq T \leq T_2 \leq 700°\text{C.}$ wherein,

T₀ is the temperature (°C.) of the fed steam;
T₂ is the maximum temperature (°C.) of the catalyst bed; and
T is the average temperature (°C.) of the catalyst bed, which is defined by the formula:

$$T = \sum_{i=1}^{n} T_i/n$$

wherein $T_i$ is the time average temperature (°C.) of the i-th block of n equilength blocks of the catalyst bed, which are arranged along the direction of the steam flow; and (2) $cv(T) \times 1000 \leq 10$ wherein, cv(T) is the coefficient of variation of the time average temperature, which is defined by the formula:

$$cv(T) = s(T)/T$$

wherein,
s(T) is the standard deviation of the time average temperature, which is obtained from s(T)² which is the variance of the time average temperature and defined by the formula:

$$s(T)^2 = \sum_{i=1}^{n} (T_i - T)^2/n,$$

wherein T and Ti are as defined above, thereby steaming the zeolite to partially dealuminate the zeolite.

The zeolite which can be partially dealuminated by the method of the present invention has an Si/Al atomic ratio of from 2 to 60 in the zeolite structure thereof. Examples of zeolites usable in the present invention include β-zeolite, Ω-zeolite, Y-zeolite, L-zeolite, erionite, offretite, mordenite, ferrierite, ZSM-5, ZSM-8, ZSM-11, ZSM-12, ZSM-35 and ZSM-38. Of these, crystalline aluminosilicates and crystalline metallosilicates of the ZSM-5 family, i.e., ZSM-5, ZSM-8 and ZSM-11, etc. are preferred. With respect to the details of zeolites of the ZSM-5 family, reference can be made to U.S. Pat. No. 5,268,162. The zeolite may be in an H form or in a metal-substituted form. In the case of the metal-substituted zeolite, a metal belonging to Group VIII, Ib, IIb or IIIb of the Periodic Table is preferred as a substituent. Further, the zeolite may be used in combination with a binder, such as alumina, and/or a metal oxide, such as zinc oxide, which metal oxide is capable of promoting the dehydrogenation of the zeolite. With respect to each of the H form zeolite and the metal-substituted zeolite, it is known that the activity thereof varies depending on the content of sodium in the zeolite. It is preferred that the sodium content of each of the H form zeolite catalyst and the metal-substituted zeolite catalyst, each prior to the steaming, be relatively low, particularly 500 ppm by weight or less. Such a low sodium content is important especially when the zeolite has an Si/Al atomic ratio of 12 or more in the zeolite structure thereof.

Among metals belonging to Group VIII, Ib, IIb or IIIb of the Periodic Table, which can be used in the present invention, a metal selected from Zn, Cu, Ag, Ni, Pt, Pd and Ga is preferred. Of these metals, Zn, Ag, Ni and Ga are especially preferred. The metal can either be substitution-introduced in the crystal lattice of the zeolite of a zeolite catalyst prior to the steaming, or be present in the form of a metal oxide which is contained in a zeolite catalyst prior to the steaming. The zeolite catalyst can further comprise at least one metal selected from the above-mentioned metals. It is preferred that the zeolite catalyst comprises a mixture of the above-mentioned zeolite and at least one member selected from the group consisting of the above-mentioned metals and compounds thereof. More preferably, the zeolite catalyst further comprises alumina and silica as binders.

In the present invention, the Si/Al atomic ratio means an Si/Al atomic ratio as measured by $^{29}$Si-NMR. With respect to the method for the measurement of the Si/Al atomic ratio by $^{29}$Si-NMR, reference can be made to "Jikken Kagaku Koza (Lecture On Experimental Chemistry) 5, NMR", 4th edition, p. 232–233, 1992, published by Maruzen Co., Ltd., Japan.

In the method of the present invention, it is preferred that steam to be flowed through the reactor have a steam partial pressure of at least 0.1 kg/cm². The steam may be diluted with an inert gas. In this case, the concentration of the diluted steam is preferably not less than 10% by volume, more preferably from 20 to 80% by volume. As an inert gas, a gas other than such gases (e.g., alcohols and ethers) as will generate H₂O when contacted with a zeolite, can be used, and nitrogen is especially preferred. The weight hourly space velocity (WHSV) of the steam to be flowed through the reactor is preferably set at a value such that the steam partial pressure does not become non-uniform in the catalyst bed and other problems, such as channeling or biased flowing of steam, do not occur. More specifically, it is preferred that the WHSV value be 0.01 to 10 hr⁻¹.

As reactors which can be used for practicing the method of the present invention, there can be mentioned (I) an indirect heat transfer type reactor in which heat is transferred to a reactant through the wall of the reactor; (II) a direct heat transfer type reactor in which a reactant is directly contacted with a heating medium as a heat source; and (III) an adiabatic type reactor in which a heat exchange between a reactant and the outside of the reactor does not occur. All of the above types of reactors are described in "Kogyo Hanno Sochi (Industrial Reaction Apparatus)", edited by Kenji Hashimoto, p.20–26, 1984 (published by Baifukan Co., Ltd, Japan). In any of the above types of reactors, it is preferred that the reactor be of a fixed-bed type. As examples of adiabatic type reactors, there can be mentioned those of a fixed-bed type, a moving-bed type, and a fluidized-bed type. In the method of the present invention, an adiabatic type reactor of a fixed-bed, single-stage type (in which a catalyst bed of only a single stage is provided) is preferred, but a heat exchanger-interposed, fixed-bed, multi-stage, adiabatic type reactor can also be used (in which a catalyst bed is divided into a plurality of stages, and a heat exchanger is interposed between adjacent stages to supply heat to or remove heat from the respective stages).

It is well known that in steaming a zeolite for improving the stability, especially the catalytic activity stability, of the zeolite, the stability and activity of the steamed zeolite vary depending on the severity of the steaming conditions. Illustratively stated, on one hand, when the steam partial pressure or the temperature of the zeolite catalyst during the steaming is relatively high, or when the time for feeding steam to the reactor is relatively long, the zeolite after the steaming is relatively well stabilized. On the other hand, however, when the steam partial pressure or the temperature of the zeolite catalyst is too high, or the time for feeding steam to the reactor is too long, the activity of the zeolite catalyst after the steaming becomes lower than the desired activity. Therefore, for obtaining a zeolite catalyst having both a high stability and a high activity by steaming which are sufficient for reactions using the steamed zeolite catalyst, it is requisite that the severity of the steaming conditions be appropriately controlled.

It is known that the stabilization of a zeolite by steaming is ascribed to the reaction in which aluminum in the zeolite is liberated from the zeolite structure by the action of steam. The heat of reaction generated in steaming a zeolite is large, and the dealumination rate of a zeolite is heavily dependent on the temperature. Therefore, when commercial-scale production is intended so as to obtain a partially dealuminated zeolite catalyst having a satisfactory stability and a high activity in a steaming reactor uniformly over the entire region thereof by steaming under conditions such that the internal temperature of the reactor is not higher than an upper limit temperature which the reactor can stand, it is extremely important to control the severity of the steaming conditions, particularly the temperature of the catalyst during the steaming.

It is presumed that by steaming, the aluminum in a zeolite is liberated from the zeolite structure via the following reaction route:

(1) The partial dealumination proceeds in accordance with the reactions of the above two stages.

(2) The first-stage reaction is a reversible reaction, and, therefore, when the feeding of steam ($H_2O$) is stopped, the Al in the $Al(H_2O)_n$ as an intermediate is returned to the interior of the zeolite structure.

(3) The rate of the first-stage reaction is extremely high as compared to the rate of the second-stage reaction. The heat of reaction generated in the steaming is ascribed only to the first-stage reaction.

(4) The second-stage reaction is an irreversible reaction, and the reaction rate thereof is extremely low as compared to the rate of the first-stage reaction.

As mentioned above, the heat of reaction generated by the first-stage reaction is large and the first-stage reaction proceeds very fast. Therefore, when steam is excessively fed to a catalyst bed in a reactor, the temperature of the catalyst bed is rapidly elevated over the entire region of the catalyst bed. Thereafter, the elevation of the temperature no longer occurs and the catalyst bed is cooled with steam or inert gas which continues to flow through the reactor.

The method of the present invention will now be described in detail with reference to FIG. 1, which shows one embodiment of the method of the present invention suitable for commercially practicing the method of the present invention.

In the present invention, the term "internal temperature of the reactor" is intended to mean the temperature determined by a method in which, with respect to n equilength blocks of the catalyst bed in the reactor, which are arranged along the direction of flow of the fluid (steam, inert gas) fed to the catalyst bed, the temperature of each block at a middle portion thereof in the fluid flow direction is measured continuously or intermittently during the steaming. The term "time average temperature of the i-th block of n equilength blocks of the catalyst bed, which are arranged along the direction of the steam flow" (represented by $T_i$) is intended to mean the average of the temperatures of the i-th block of the catalyst bed which are measured continuously or intermittently during the steaming as mentioned above. The term "average temperature of the catalyst bed" (represented by T) is intended to mean the average of the respective time average temperatures ($T_i$) of the n blocks, and can be defined by the formula:

$$T = \sum_{i=1}^{n} T_i/n$$

The term "maximum temperature of the catalyst bed" (represented by $T_2$) is intended to mean the maximum temperature in a temperature distribution curve (hereinafter frequently referred to as "time average temperature distribution curve") obtained from the time average temperatures ($T_i$) of the n-blocks. The term "temperature of the fed steam" (represented by $T_0$) is the temperature of the catalyst bed at the portion which is first contacted by the fed steam.

In the present invention, the internal temperature of the reactor is controlled by means of a thermoelectric thermometer described at pages 384 to 389 of "Enerugii Kanri Gijutsu [Netsu Kanri-hen] (Energy Control Techniques [Heat Control])" edited by the committee for the edition of "Energy Control Techniques [Heat Control]" (published in 1989 by Energy Saving Center, Japan).

FIG. 1 is an explanatory view of the uniform temperature distribution in the catalyst bed, which is achieved by one embodiment of the method of the present invention, shown together with a non-uniform temperature distribution. In the method, a fixed-bed, single-stage adiabatic type reactor is used, and the steaming is conducted by feeding steam at a temperature of $T_0$ to the reactor from an upper portion thereof and flowing the steam through the reactor for 60 minutes. In FIG. 1, the solid lines show the respective temperature distributions in the reactor at predetermined points of time from the start of the feeding of steam, and the broken line shows the distribution of the time average temperatures of the respective blocks of the catalyst bed with respect to the period of time of from immediately after the start of the feeding of steam through 60 minutes after the start of the feeding of steam. When the steaming is conducted for a long period of time at a time average temperature distribution as indicated by the broken line in FIG. 1, the portion of the catalyst bed which is close to the inlet of the reactor, i.e., the portion of the catalyst bed which is first contacted by the fluid fed to the catalyst bed, becomes higher in activity than the portion of the catalyst bed which is close to the outlet of the reactor, thereby producing a non-uniform catalyst activity distribution after the steaming. That is, the average catalyst activity of the entire catalyst bed after being steamed at the time average temperature distribution as indicated by the broken line in FIG. 1 is equal to the catalyst activity which is exhibited by the catalyst bed after being steamed at a uniform temperature distribution [in which the temperature is equal to the average temperature of the catalyst bed (T) as indicated by the dot-and-dash line in FIG. 1], but, in the former case, where steaming is conducted at the time average temperature distribution as indicated by the broken line in FIG. 1, the catalyst bed exhibits a non-uniform distribution of catalytic activity. Therefore, when a catalyst bed which has been subjected to steaming at a time average temperature distribution as indicated by the broken line in FIG. 1 is used for, e.g., a catalytic cyclization reaction, there is a problem in that the catalyst bed undergoes vigorous coking at a portion close to the inlet of the reactor, so that a large deterioration of the catalyst due to coking occurs. For this reason, for obtaining a catalyst bed which has a high and stabilized catalytic activity over the entire area thereof, it is preferred that the steaming be conducted at a substantially uniform temperature distribution, such as is indicated by the dot-and-dash line in FIG. 1.

As described above, in the method of the present invention, it is requisite that the steaming of the zeolite catalyst of the catalyst bed be conducted under temperature distribution conditions which satisfy the following requirements (1) and (2):

(1) $500°\ C. \leq T_0 \leq T \leq T_2 \leq 700°\ C.$ wherein, $T_0$ is the temperature (°C.) of the fed steam;

$T_2$ is the maximum temperature (°C.) of the catalyst bed; and

T is the average temperature (°C.) of the catalyst bed, which is defined by the formula:

$$T = \sum_{i=1}^{n} T_i/n$$

wherein $T_i$ is the time average temperature (°C.) of the i-th block of n equilength blocks of the catalyst bed, which are arranged along the direction of the steam flow; and (2) $cv(T) \times 1000 \leq 10$ wherein, cv(T) is the coefficient of variation of the time average temperature, which is defined by the formula:

$$cv(T) = s(T)/T$$

wherein, s(T) is the standard deviation of the time average temperature, which is obtained from $s(T)^2$ which is the variance of the time average temperature and defined by the formula:

$$s(T)^2 = \sum_{i=1}^{n} (T_i - T)^2/n,$$

wherein T and $T_i$ are as defined above.

In the method of the present invention, it is requisite that the internal temperature of the reactor, i.e., all of the temperature of the fed steam ($T_0$), the average temperature of the catalyst bed (T) and the maximum temperature of the catalyst bed ($T_2$), be from 500° C. to 700° C., preferably from 600° C. to 700° C., more preferably 600° C. to 680° C. When any of $T_0$, T and $T_2$ is lower than 500° C., for obtaining a catalyst having such an activity, over the entire region of the catalyst bed, which is high and stable for a long period of time, it is disadvantageously necessary to conduct the steaming for a prolonged period of time. On the other hand, when any of $T_0$, T and $T_2$ is higher than 700° C., the temperature of the catalyst bed becomes extremely high due to the reaction heat generated by the steaming, so that it becomes necessary for the reactor to be made of a special material having a resistance to corrosion at high temperatures. Further, when the steaming is conducted for a prolonged period of time at temperatures higher than 700° C., a broad temperature distribution is produced in the catalyst bed due to the generated reaction heat, and, hence, an unevenness in the dealumination degree is produced in the catalyst bed, so that the catalyst bed after the steaming has a non-uniform catalytic activity distribution. In this case, for example, when the reactor is a fixed-bed, single-stage adiabatic type reactor, the upper portion of the catalyst bed becomes higher in catalytic activity than the lower portion of the catalyst bed, so that not only does the upper portion of the catalyst bed undergo vigorous coking at the time of the subsequent reaction using the steamed zeolite catalyst, but also a rapid lowering of the activity of the upper portion of the catalyst bed occurs. In addition, when the steaming is conducted for a prolonged period of time at temperatures higher than 700° C., there is also a problem that the catalyst is deactivated due to the high steaming temperature.

In the method of the present invention, it is preferred that the time for steaming be from 0.1 to 50 hours. When the steaming time is less than 0.1 hour, the catalytic activity after the steaming is too high, so that a large lowering of the catalytic activity due to coking at the time of the subsequent reaction using the steamed catalyst is likely to occur. On the other hand, when the steaming time is more than 50 hours, the catalytic activity after the steaming is too low, so that the productivity in the subsequent reaction using the steamed catalyst is likely to be lowered.

In the present invention, the coefficient of variation of the time average temperature is intended to mean a coefficient of variation as defined in a purely statistical aspect [see, for example, pp. 9–10 of "Kagakusha Oyobi Kagakugijutsusha No Tame No Tokeiteki Hoho (Statistical Methods for Chemists and Chemical Engineers)" written by Ishikawa et al. (published by Tokyo Kagaku Dozin Co., Ltd., Japan, 1984)]. By means of the coefficient of variation, the magnitude of the variation of the time average temperature of a catalyst bed, relative to the average temperature of the catalyst bed, can be shown. Accordingly, when the coefficient of variation is large, it means that the variation in the temperature of the catalyst bed is broad. When the value of the coefficient of variation multiplied by 1000 exceeds 10, the temperature distribution of the catalyst bed during the steaming becomes broad and, hence, the catalyst after the steaming has a non-uniform catalytic activity distribution. When such a catalyst bed is used in a catalytic cyclization reaction, coking vigorously occurs in the catalyst bed at a portion thereof having a relatively high activity, resulting in a serious catalyst deterioration.

The method of the present invention can be practiced in various ways so as to satisfy the requirements specified above. For example, as described below in detail, in the method of the present invention, the flowing of steam through the reactor to contact the zeolite catalyst with the steam can be conducted in 2 or more stages under respective specific conditions. Alternatively, in the method of the present invention, there can be employed various modes, for example, a mode in which the temperature of the fed steam ($T_0$) is gradually raised, so that a lowering (as shown in FIG. 1) of the catalyst bed temperature at a portion close to the inlet of the reactor with the passage of time from immediately after the start of the feeding of steam can be prevented; a mode in which the steaming is conducted using a reactor, having a very large diameter, in which the catalyst is packed in a thickness as small as possible; and a mode in which the steaming is conducted using a number of moving-bed reactors, each containing a catalyst bed of short length.

In a preferred embodiment of the present invention, the flowing of the steam through the reactor to contact the zeolite catalyst with the steam is conducted in a sequence of the following steps (A) and (B):

(A) flowing steam having a steam partial pressure of at least 0.1 kg/cm² and a temperature of 500° to 650° C. through the reactor, to thereby contact the zeolite catalyst with the steam for 0.1 to 3 hours; and (B) temporarily stopping the flowing of the steam through the reactor and removing the steam which remains in the reactor, whereupon steam having a steam partial pressure of 0.1 to 10 kg/cm² and a temperature of 500° to 700° C. is flowed through the reactor, with the proviso that the temperature of the steam flowed in step (B) is higher than the temperature of the steam flowed in step (A), wherein the step (B) is performed at least once, so that the steam individually flowed in the or each step (B) is brought into contact with the zeolite catalyst which has been steamed in the step preceding the or each step (B).

In this preferred embodiment of the method of the present invention, the flowing of steam through the reactor is preferably conducted in 2 or more stages in such a manner as described below, so that the temperature difference between the upper portion and lower portion of the catalyst bed can be reduced, thereby enabling the steaming to be performed stably and uniformly.

The first-stage operation of the multistage steaming process according to this preferred embodiment of the invention is conducted as follows.

In step (A), steam having a steam partial pressure of at least 0.1 kg/cm$^2$, preferably 0.5 to 1 kg/cm$^2$ and a temperature of 500° to 650° C., preferably 550° to 650° C., more preferably 600° to 620° C. is flowed through the reactor, to thereby contact the zeolite catalyst with the steam for 0.1 to 3 hours, preferably 0.1 to 1 hour.

When the steam temperature is lower than 500° C., the effect of suppressing the generation of the heat of reaction in the second-stage steaming (and in the steaming of any further subsequent stages) is hardly exerted. When the steaming is effected at temperatures higher than 650° C., the temperature of the catalyst bed rises extremely due to the heat of reaction generated by the steaming, so that problems occur such that a special material having a high corrosion resistance at high temperatures must disadvantageously be used for the reactor. Further, when the steaming time in the first-stage is too long, a broad distribution of temperature occurs in the catalyst bed due to the heat of reaction generated by the steaming and, hence, a non-uniformity is caused in the degree of dealumination in the catalyst bed, so that the distribution of catalytic activity after the steaming becomes non-uniform.

The second-stage operation of the multistage steaming process is conducted as follows.

In step (B), first, the flowing of the steam through the reactor is temporarily stopped and the steam remaining in the reactor is purged with an inert gas as mentioned above having a temperature of 20° to 700° C., preferably 20° to 600° C. In this instance, it is preferred that not only must the average temperature of the catalyst bed be rendered equal to the temperature of the steam to be subsequently used in the second-stage steaming operation, but also the temperature distribution of of the catalyst bed must be rendered uniform to a degree such that the difference between the maximum temperature and the minimum temperature is 10° C. or lower. When the steam remaining in the reactor is not removed after temporarily stopping the flow of steam, the dealumination of the zeolite catalyst is caused to advance by the action of the remaining steam, which is undesirable from the viewpoint of achieving uniform dealumination of the zeolite catalyst. After removal of the remaining steam, steam having a steam partial pressure of 0.1 to 10 kg/cm$^2$, preferably 0.5 to 1 kg/cm$^2$ and a temperature of 500° to 700° C., preferably a temperature which is within ±10° C. with respect to the maximum temperature of the catalyst bed which has been reached by the first-stage steaming, is flowed through the reactor to thereby contact the steam with the zeolite catalyst for 0.1 to 50 hours, preferably 0.1 to 20 hours.

The above-mentioned second-stage operation (B) may also be conducted twice or more.

The heat of reaction which is generated by the steaming in the second-stage (B) is ¼ to ⅓ of the heat of reaction generated in the first-stage steaming (A) and, hence, the uniformity of the temperature in the catalyst bed in the second-stage steaming is higher than in the first-stage steaming, so that a zeolite catalyst having a good stability and a high activity over the entire region of the reactor can be obtained, thereby rendering it possible to produce the desired high stability zeolite catalyst on a commercial scale and under conditions such that the temperature of the reactor does not exceed an upper limit temperature which the reactor can stand.

Figure 2A:
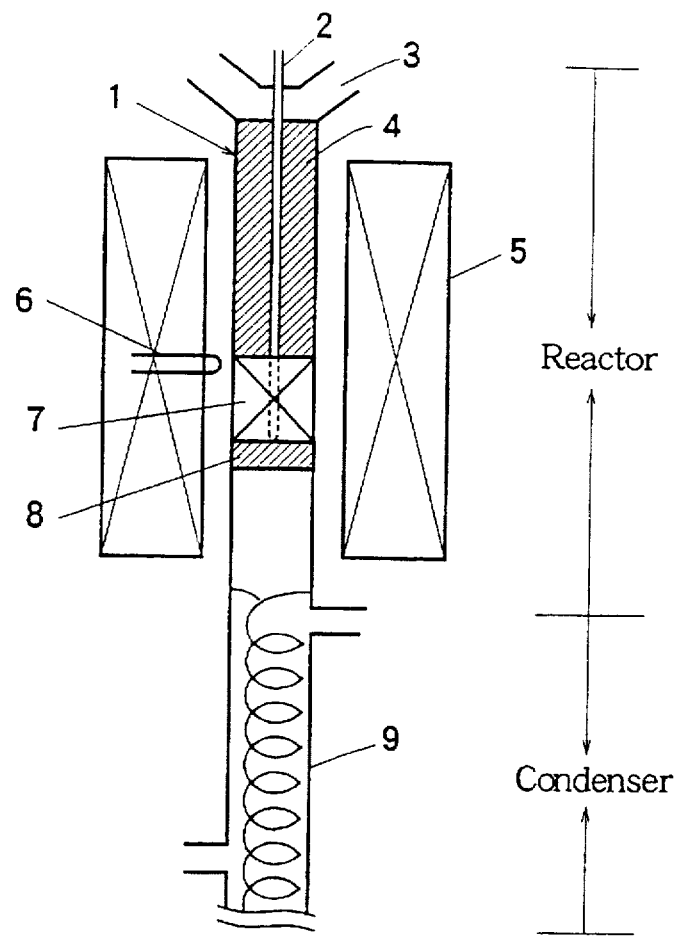
FIGS. 2(a) and 2(b) show diagrammatic views of an isothermal reactor, which is one form of the reactor to be used for evaluation of a partially dealuminated zeolite catalyst obtained by the method of the present invention.
Figure 2B:
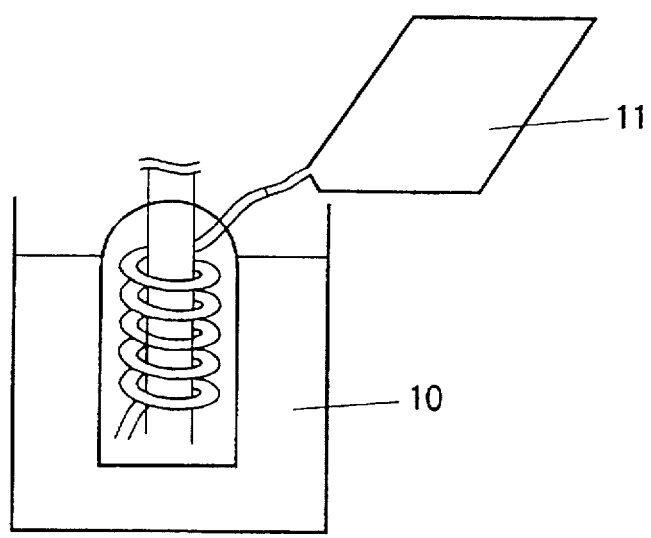

Incidentally, the term "initial stage, first-order reaction rate constant of the decomposition of n-hexane" used herein is intended to mean the average initial stage, first-order reaction rate constant of the decomposition of n-hexane catalyzed by a zeolite catalyst with respect to the gas-oil collection time of 0.25 hour, which constant can be obtained from the below-mentioned formula and the concentration value of the n-hexane in the reaction product obtained by using the zeolite catalyst and the apparatus shown in FIGS. 2(a) and 2(b). Illustratively stated, the above-mentioned average initial stage, first-order reaction rate constant of the decomposition of n-hexane catalyzed by a zeolite catalyst is obtained as follows. Referring to FIGS. 2(a) and 2(b), quartz reaction tube (1) is packed with quartz wool (8), catalyst (7) and Raschig ring (4) in this order, from lower to upper portions of quartz reaction tube (1). Quartz reaction tube (1) is heated by means of electric furnace (5) provided with thermocouple (6) for adjusting temperature, which furnace (5) enables the temperature of catalyst (7) contained in quartz reaction tube (1) to be constantly 500° C. as measured by thermometer (2). Then, n-hexane is charged into quartz reaction tube (1) from inlet (3) for feedstock through Rasching ring (4) under atmospheric pressure and at a weight hourly space velocity (WHSV) of 4 hr$^{-1}$. The reaction product obtained for a predetermined period of time (0.25 hour) between two points of time of 0.75 hour and 1 hour each after the n-hexane is charged is cooled with condenser (9), followed by further cooling with a coolant composed of dry ice and ethanol in oil trap (10). All the separated oil component in oil trap (10) and all the separated gaseous component in gas collector bag (11) are collected. The compositions of the obtained gaseous component and oil component are respectively analyzed by means of FID-TCD gas chromatography (HP-5890 Series II, manufactured and sold by Hewlett Packard Company, U.S.A.) and FID gas chromatography (GC-17A manufactured and sold by Shimadzu Corp., Japan), thereby obtaining the concentration value of n-hexane in the reaction product. The concentration value of n-hexane is substituted for the corresponding item in the following formula to obtain the average initial stage, first-order reaction rate constant of the decomposition of n-hexane catalyzed by the zeolite catalyst with respect to the gas-oil collection time of 0.25 hour.

average initial stage, first-order reaction rate constant of the
decomposition of n-hexane catalyzed by the zeolite catalyst
with respect to the gas-oil collection time of 0.25 hour [hr$^{-1}$] =

$$\frac{1}{\theta} \times \ln\frac{100}{100 - (\text{n-hexane conversion})}$$

$$\theta[\text{hr}] = \frac{\text{volume of zeolite catalyst [m}^3\text{]}}{\text{flow rate of feedstock fluid [m}^3\text{/hr]}}$$

[wherein the "volume of zeolite catalyst" is intended to mean the volume of the zeolite catalyst per se, and wherein when the catalyst bed contains inert substances (such as Raschig ring and glass beads) in addition to the zeolite catalyst, the volume of the inert substances is not included in the "volume of zeolite catalyst"]

n-hexane conversion [%] = 100 − concentration of n-hexane in reaction product [wt %]

In the present invention, the initial stage-specific activity of a zeolite catalyst after the steaming can be obtained by the following formula, based on the initial stage, first-order reaction rate constants of the decomposition of n-hexane catalyzed by a zeolite catalyst prior to the steaming and after the steaming, which constant can be obtained in accordance with the method described above.

$$\text{Initial stage-specific activity} = \frac{\text{Average initial stage, first-order reaction rate constant of the decomposition of n-hexane catalyzed by the steamed zeolite catalyst}}{\text{Average initial stage, first-order reaction rate constant of the decomposition of n-hexane catalyzed by the zeolite catalyst prior to the steaming}}$$

In the method of the present invention, it is preferred that the partially dealuminated zeolite catalyst have an initial stage-specific activity which satisfies the following formula:

Coefficient of variation of the initial stage-specific activity of all the partially dealuminated zeolite catalyst contained in the reactor $\leq 0.1$ In the present invention, the coefficient of variation of the initial stage-specific activity of all the partially dealuminated zeolite catalyst contained in the reactor is defined by the below-mentioned formulae. As described at pp. 9–10 of "Kagakusha Oyobi Kagakugijutsusha No Tame No Tokeiteki Hoho (Statistical Methods for Chemists and Chemical Engineers)" written by Ishikawa et al. (published by Tokyo Kagaku Dozin Co., Ltd., Japan, 1984), by means of the coefficient of variation, the magnitude of the variation of an initial stage-specific activity, relative to the average initial stage-specific activity, can be expressed. Therefore, when the coefficient of variation of the initial stage-specific activity is large, it means that the variation in the initial stage-specific activity of the catalyst in the catalyst bed is broad. When the value of the coefficient of variation exceeds 0.1, the distribution of activity in the catalyst bed after the steaming is non-uniform. When such a catalyst bed is used in a catalytic cyclization reaction, etc., coking vigorously occurs in the catalyst bed at the portion thereof having a relatively high activity, resulting in a serious catalyst deterioration.

Average value of the initial stage-specific activity:

$$k_{ave} = \sum_{i=1}^{n} k_i/n$$

Variance of the initial stage-specific activity:

$$s(k)^2 = \sum_{i=1}^{n} (k_i - k_{ave})^2/n$$

Coefficient of variation of the initial stage-specific activity:

$$cv(k) = s(k)/k_{ave}$$

In the above formulae:

$k_i$: an average initial stage-specific activity of the i-th block of n equilength blocks of the catalyst bed, which are arranged along the direction of steam flow; and $s(k)$: standard deviation of the initial stage-specific activity.

In the present invention, it is desirable that the degree of the dealumination of a partially dealuminated zeolite catalyst be from 0.05 to 0.5, preferably from 0.06 to 0.3, more preferably from 0.15 to 0.3 in terms of the average value of the initial stage-specific activity ($k_{ave}$) as defined by the above formulae. When the average value of the initial stage-specific activity ($k_{ave}$) of the partially dealuminated zeolite catalyst is within the above-mentioned range, it is possible to conduct a stable catalytic reaction, such as a catalytic cyclization reaction with the advantage that not only the occurrence of coking, but also the formation of by-products is reduced to a low level.

In the method of the present invention, examples of materials usable as at least one member selected from the group consisting of zinc and compounds thereof (hereinafter frequently referred to as a "zinc component") include zinc; zinc oxide; zinc hydroxide; salts, such as zinc nitrate, zinc carbonate, zinc sulfate, zinc chloride, zinc acetate and zinc oxalate; and organic zinc compounds, such as alkyl zinc.

In the method of the present invention, the alumina can be anhydrous alumina or hydrated alumina. Also, materials which are capable of producing anhydrous or hydrated alumina by hydrolysis, thermal decomposition, oxidation or the like thereof, can be used.

When a zeolite catalyst containing alumina is steamed by the method of the present invention, the alumina content of the catalyst, in terms of $Al_2O_3$, is 5 to 50% by weight, preferably 20 to 40% by weight, based on the weight of the zeolite catalyst. When zinc is contained in addition to alumina, the molar ratio of alumina to zinc ($Al_2O_3/Zn$ molar ratio) is 1 or more.

In the method of the present invention, it is preferred that the zeolite catalyst prior to the steaming comprise a mixture of the zeolite, a zinc component and alumina. It is also preferred that the zeolite catalyst prior to the steaming comprise a mixture of the zeolite and the product obtained by heat-treating in steam a mixture of alumina and a zinc component. In either case, when the zeolite catalyst is steamed by the method of the present invention, the zinc component and the alumina react with each other to produce zinc aluminate in which the zinc is stabilized, so that evaporation loss of the zinc under reaction conditions is largely reduced. Also, when the zeolite catalyst prior to the steaming comprises a mixture of the zeolite and zinc aluminate, the same effects as mentioned above can be obtained. The zinc aluminate referred to herein means zinc aluminate which exhibits the same X-ray diffraction pattern as shown in JCPDS 5-0669 NBS Circ., 539, Vol. II, 38 (1953), when measured by an X-ray diffractometer, such as XD-610 manufactured and sold by Shimadzu Corporation, Japan.

A zeolite catalyst comprising a zeolite which has been partially dealuminated according to the method of the present invention is useful for effecting various reactions, such as those described in "Zeolite No Kagaku To Ooyo (the Chemistry and application of zeolite)", pp. 190–211, edited by Hiroo Tominaga (published by Kodansha Scientific, Japan, 1993), e.g., catalytic cyclization, catalytic cracking, hydrolysis, paraffin isomerization, olefin dimerization, xylene isomerization, toluene disproportionation, ethylbenzene synthesis, etc. The reactor to be employed for the above-mentioned reactions using the zeolite catalyst may be or may not be the same as that used for obtaining the partially dealuminated zeolite catalyst having a stabilized activity, by steaming according to the method of the present invention.

Of the various reactions mentioned above, the catalytic cyclization reaction, which is a method for producing aromatic hydrocarbons in high yield from light hydrocarbons containing olefins and/or paraffins, is described below in detail.

Figure 3:
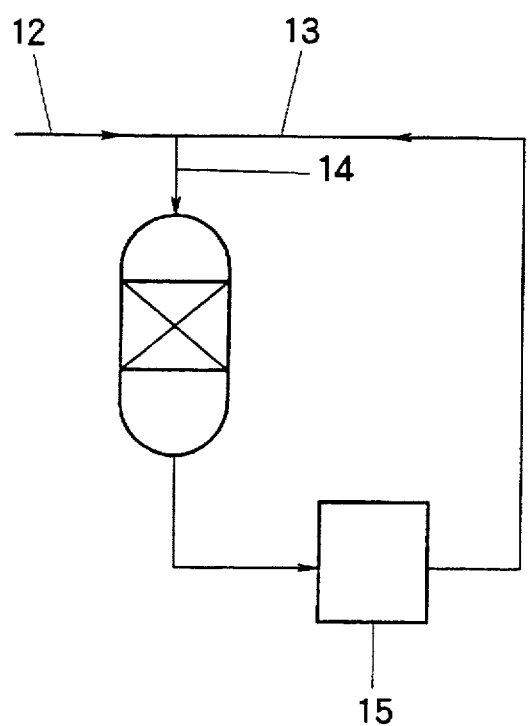
FIG. 3 is a flow sheet showing one mode of the method for producing an aromatic hydrocarbon, wherein a light hydrocarbon comprising an olefin and/or a paraffin is subjected to a catalytic cyclization reaction, using a partially dealuminated zeolite catalyst obtained by the method of the present invention.

The term "light hydrocarbons containing olefins and/or paraffins" mentioned herein means those hydrocarbons which have two or more carbon atoms and have a 90% distillation temperature at 190° C. or lower. Examples of paraffins include ethane, propane, butane, pentane, hexane, heptane, octane and nonane. Examples of olefins include ethylene, propylene, butene, pentene, hexene, heptene, octene and nonene. In addition to these olefins and/or paraffins, the light hydrocarbons to be used may also contain cycloparaffins, such as cyclopentane, methylcyclopentane and cyclohexane; cycloolefins, such as cyclopentene, methylcyclopentene and cyclohexene; and dienes, such as butadiene, pentadiene, cyclopentadiene and cyclohexadiene. These olefins and paraffins may be used individually or in mixture. The mixture may contain $N_2$, $CO_2$, CO or other inert gases as diluents. The mixture may further contain $H_2$ or $CH_4$ which are effective for suppressing occurrence of coking on the zeolite catalyst during the reaction. The content of the diluent is preferably 0 to 20% by volume, more preferably 0 to 10% by volume. It is especially preferred that the weight ratio of saturated hydrocarbons to unsaturated hydrocarbons in the hydrocarbon mixture be from 0.43 to 2.33. The term "weight ratio of saturated hydrocarbons to unsaturated hydrocarbons" mentioned herein is intended to mean the weight ratio of saturated hydrocarbons to unsaturated hydrocarbons in the hydrocarbon mixture to be fed to the reactor as a feedstock. When a portion of the reaction product withdrawn from the reactor is recycled as shown in FIG. 3, the weight ratio of saturated hydrocarbons to unsaturated hydrocarbons means the weight ratio in mixture (14) of fresh feed (12) and recycled portion (13).

Examples of hydrocarbon mixtures as a feedstock to be used include a mixture of the hydrocarbons mentioned above, a $C_4$ fraction of a product obtained by subjecting a petroleum hydrocarbon, such as naphtha, to thermal cracking at high temperatures, a fraction obtained by removing butadiene or both butadiene and i-butene from the above-mentioned $C_4$ fraction, a $C_5$ fraction of a product obtained by subjecting a petroleum hydrocarbon to thermal cracking at high temperatures, a fraction obtained by removing dienes from the above-mentioned $C_5$ fraction, thermally cracked gasoline, a raffinate obtained by extracting aromatic hydrocarbons from thermally cracked gasoline, FCC-LPG, FCC-cracked gasoline, a raffinate obtained by extracting aromatic hydrocarbons from reformate, coker LPG, or straight-run naphtha. Especially preferred mixtures are the $C_4$ fraction and $C_5$ fraction of a high-temperature thermal-cracking product from a petroleum hydrocarbon, such as naphtha, and fractions obtained by removing at least a part of butadiene, i-butene, isoprene, and cyclopentadiene from the $C_4$ and $C_5$ fractions. More preferred materials are those in which the $C_4$ fraction and the $C_5$ fraction are present in a $C_4/C_5$ weight ratio of 3/7 to 7/3. The term "high-temperature thermal-cracking product" used herein means a product produced by means of a thermal-cracking apparatus to be used for a thermal-cracking process using pipes, which is called "steam cracking". Steam cracking is described in The Oil and Gas Journal, pp. 220–222, May 12, 1969.

The term "weight ratio of a $C_4$ fraction to a $C_5$ fraction" referred to herein means the weight ratio of a $C_4$ fraction to a $C_5$ fraction in a mixture to be fed to the reactor as a feedstock. When a portion of the reaction product withdrawn from the reactor is recycled as shown in FIG. 3, the weight ratio of a $C_4$ fraction to a $C_5$ fraction means the weight ratio in mixture (14) of fresh feed (12) and recycled portion (13). The mixture may contain impurities, such as oxygen-containing compounds, e.g., TBA (tertiary butylalcohol), methanol, or the like.

For performing a catalytic cyclization reaction, the feedstock as mentioned above is fed to the reactor at a weight hourly space velocity (WHSV) of 0.1 to 50 $hr^{-1}$. The reaction is performed at a temperature of 450° to 650° C., preferably 490° to 600° C., and more preferably 500° to 580° C., and at a pressure of 2 to 10 $kg/cm^2 \cdot G$.

If coking occurs on the zeolite catalyst during the reaction, the catalyst can be regenerated by burning off the coke with oxygen-containing inert gases. The oxygen-containing inert gases after usage for burning off the coke can be released into the atmosphere or can be reused by using a recycling compressor. In either case, it is preferred to use an oxygen-containing inert gas having a low water content. The oxygen content of the oxygen-containing inert gas is preferably 0.1 to 10% by volume, more preferably 0.5 to 2% by volume. The oxygen-containing inert gas is heated to 350° to 600° C., preferably 390° to 580° C., more preferably 420° to 480° C., before use, and introduced into a reactor containing a zeolite catalyst having coke adhered thereto. The inert gas is selected from gases other than those (e.g., alcohol and ether) which generate $H_2O$ upon being contacted with a zeolite. Especially desirable as an inert gas is nitrogen.

In the method of the present invention, the recycling compressor, heater, heat exchanger and pipes which are used for regenerating the catalyst by burning can also be used for conducting the steaming of the catalyst.

In a process for producing aromatic hydrocarbons from light hydrocarbons containing olefins and/or paraffins by a catalytic cyclization reaction in a fixed-bed, adiabatic type reactor, a zeolite catalyst which is partially dealuminated according to the method of the present invention can be advantageously used. In the above process, aromatic hydrocarbons can be obtained with high selectivity at high yield for a prolonged period of time. Further, the zeolite catalyst is not likely to undergo coking and, hence, deterioration of the catalyst due to coking does not occur, so that the catalytic activity can be maintained for a prolonged period of time.

When the temperature of steam to be fed ($T_0$), the maximum temperature of the catalyst bed ($T_2$), or the average temperature of the catalyst bed (T) exceeds 700° C., or when the flowing of the steam is continued for a period of time longer than 50 hours, the catalytic activity is lowered over the entire region of the catalyst bed after the steaming, so that the yield of aromatic hydrocarbons by the subsequent catalytic cyclization reaction is lowered. Also, when the steam flowing time is shorter than 0.1 hour, the catalytic activity remains too high, so that vigorous coking occurs at the time of the subsequent reaction using the catalyst. When the value of the coefficient of variation of the time average temperature of the catalyst bed multiplied by 1000 exceeds 10, the temperature distribution of the catalyst bed during the steaming becomes broad and, hence, the catalyst after the steaming has a non-uniform catalytic activity distribution. When such a catalyst bed is used in a catalytic cyclization reaction, coking vigorously occurs in the catalyst bed at the portion thereof which has a relatively high activity, resulting in a serious deterioration of the catalyst.

BEST MODE FOR CARRYING OUT THE INVENTION

The present invention will now be further illustrated in more detail with reference to the following Examples and Comparative Examples, which should not be construed as limiting the scope of the present invention.

EXAMPLE 1

(1) 60 parts by weight of ZSM-5 crystalline aluminosilicate (having an Si/Al atomic ratio of 46 in a zeolite structure thereof) in ammonium ion form, 15 parts by weight of γ-alumina and 25 parts by weight of zinc nitrate were kneaded, and the resultant mixture was subjected to extrusion molding, thereby obtaining a molded product having a diameter of 1.6 mm and a length of 4 to 6 mm. The molded product was dried at 120° C. for 4 hours and, then, calcined for 3 hours to obtain a molded ZSM-5 zeolite catalyst containing 10% by weight of zinc.

(2) In practicing the steaming in a first-stage of the method of the present invention, a fixed-bed, adiabatic type reactor was packed with the obtained molded zeolite catalyst to form a catalyst bed, and the catalyst bed was heated to 600° C. under flowing nitrogen. A steam-nitrogen gas mixture containing 40% by volume of steam and having a pressure of 1 kg/cm²·G (in which the steam partial pressure is 0.8 kg/cm²) and a temperature of 600° C., was fed to and flowed through the reactor at a weight hourly space velocity (WHSV) of 0.08 hr⁻¹ for 10 minutes. With respect to 21 equilength blocks of the catalyst bed which are arranged along the direction of steam flow, changes with time of the temperature of each of the blocks during the steaming were measured. Then, in a second-stage, the feeding and flowing of the steam were, first, temporarily stopped and the steam remaining in the reactor was purged with a nitrogen gas. The temperature of the catalyst bed was elevated to and fixed at 640° C. under flowing nitrogen. Subsequently, a steam-nitrogen gas mixture containing 40% by volume of steam and having a pressure of 1 kg/cm²·G (in which the steam partial pressure is 0.8 kg/cm²) and a temperature of 640° C., was fed to and flowed through the reactor at a WHSV of 0.08 hr⁻¹ for 14 minutes. Changes with time of the temperature of each of the blocks during the steaming were measured.

The above steaming was conducted using a recycling compressor, a heat exchanger, a heater and pipes, which are to be used for regenerating the catalyst by burning.

(3) For evaluating the degree of dealumination of the molded zeolite catalyst, the conversion reaction test for n-hexane was conducted. It is well known that the initial stage, first-order reaction rate constant of the decomposition of n-hexane catalyzed by the zeolite catalyst is in proportion to the Si/Al atomic ratio of a zeolite in a zeolite catalyst. Accordingly, a portion of each of the 21 equilength blocks of the catalyst bed of the above-obtained partially dealuminated zeolite catalyst was taken out and, with respect to each of the portions of the catalyst, a decomposition reaction of n-hexane was individually conducted using a reactor [of the type as described above, referring to FIGS. 2(a) and 2(b)] at 500° C. for 0.25 hour under atmospheric pressure, and at a weight hourly space velocity (WHSV) of 4 hr⁻¹. With respect to the portion of each of the 21 equilength blocks of the steamed catalyst bed, the average initial stage, first-order reaction rate constant of the decomposition of n-hexane in the decomposition reaction of n-hexane was obtained.

The initial stage-specific activities of the catalysts after the steaming were individually obtained, based on the initial stage, first-order reaction rate constants of the decomposition of n-hexane catalyzed by the catalysts prior to the steaming and after the steaming.

The respective initial stage-specific activities of the upper part, middle part and lower part of the catalyst bed of the partially dealuminated zeolite catalyst and the coefficient of variation thereof are shown in Table 1, together with the reaction conditions of the partial dealumination of the zeolite catalyst, etc. The initial stage-specific activity of the partially dealuminated zeolite catalyst shown in Table 1 is in proportion to the degree of dealumination of the zeolite.

In Table 1, the initial stage-specific activity of the upper part of the catalyst bed means the average of the initial stage-specific activities obtained with respect to the 1st (uppermost) to the 3rd blocks of the 21 equilength blocks of the catalyst bed; the initial stage-specific activity of the middle part of the catalyst bed means the average of the initial stagespecific activities obtained with respect to the 10th to the 12th blocks of the 21 equilength blocks of the catalyst bed; and the initial stage-specific activity of the lower part of the catalyst bed means the average of the initial stage-specific activities obtained with respect to the 18th to the 21st (lowermost) blocks of the 21 equilength blocks of the catalyst bed. Also in Table 1, the average initial stage-specific activity of the partially dealuminated zeolite catalyst means the average of the initial stage-specific activities obtained with respect to all 21 equilength blocks of the catalyst bed, and the average temperature (T) of the catalyst bed means the average of the time average temperatures of the 21 equilength blocks of the catalyst bed.

Comparative Example 1

A molded ZSM-5 zeolite catalyst was obtained by the same method as in step (1) of Example 1. In substantially the same manner as in step (2) of Example 1, steaming of the molded zeolite catalyst was conducted, except that the second-stage operation of step (2) was not performed. Illustratively stated, a fixed-bed, adiabatic type reactor was packed with a molded ZSM-5 zeolite catalyst which was obtained by the same method as in step (1) of Example 1 to form a catalyst bed, and the catalyst bed was heated to 600° C. under flowing nitrogen. A steam-nitrogen gas mixture containing 40% by volume of steam and having a pressure of 1 kg/cm²·G (in which the steam partial pressure is 0.8 kg/cm²) and a temperature of 600° C., was fed to and flowed through the reactor at a WHSV of 0.08 hr⁻¹ for one hour. With respect to 21 equilength blocks of the catalyst bed which are arranged along the direction of steam flow, changes with time of the temperature of each of the blocks during the steaming were measured. The activity of the steamed zeolite catalyst was then evaluated in the same manner as in step (3) of Example 1. The respective initial stage-specific activities of the upper part, middle part and lower part of the catalyst bed of the partially dealuminated zeolite catalyst and the coefficient of variation thereof are shown in Table 1, together with the reaction conditions of the partial dealumination of the zeolite catalyst, etc.

EXAMPLE 2

A molded ZSM-5 zeolite catalyst was obtained by the same method as in step (1) of Example 1. In substantially the same manner as in step (2) of Example 1, steaming of the molded zeolite catalyst was conducted, except that the steaming time was changed in each of the first-stage and the second-stage of step (2). Illustratively stated, in practicing the steaming in a first-stage of the method of the present invention, a fixed-bed, adiabatic type reactor was packed with the molded zeolite catalyst to form a catalyst bed, and the catalyst bed was heated to 600° C. under flowing nitrogen. A steam-nitrogen gas mixture containing 40% by volume of steam and having a pressure of 1 kg/cm²·G (in which the steam partial pressure is 0.8 kg/cm²) and a temperature of 600° C., was fed to and flowed through the reactor at a WHSV of 0.08 hr⁻¹ for one hour. With respect to 21 equilength blocks of the catalyst bed which are arranged along the direction of steam flow, changes with time of the temperature of each of the blocks during the steaming were measured. Then, in a second-stage, the feeding and flowing of the steam were, first, temporarily stopped and the steam remaining in the reactor was purged with nitrogen gas. The temperature of the catalyst bed was elevated to and fixed at 640° C. under flowing nitrogen. Subsequently, a steam-nitrogen gas mixture containing 40% by volume of steam and having a pressure of 1 kg/cm²·G (in which the steam partial pressure is 0.8 kg/cm²) and a temperature of 640° C., was fed to and flowed through the reactor at a WHSV of 0.08 hr$^{-1}$ for four hours. Changes with time of the temperature of each of the blocks during the steaming were measured.

The activity of the steamed zeolite catalyst was then evaluated in the same manner as in step (3) of Example 1.

Subsequently, in step (4), a feedstock comprising a $C_4$ fraction shown in Table 2 and a $C_5$ fraction shown in Table 3 in a weight ratio of 4:6 was heated to 530° C. and fed to and flowed through the reactor for 5 days, to thereby effect a catalytic cyclization reaction of the $C_4$ and $C_5$ fractions to obtain $C_6$–$C_9$ aromatic hydrocarbons. The yield of the formed $C_6$–$C_9$ aromatic hydrocarbons was determined. Also, the deterioration rate of the catalyst by coking during the catalytic cyclization reaction was determined according to the following formula:

$$\text{Deterioration rate} = -\frac{\ln(k/k_o)}{\text{Oil flow time (hr)}}$$

wherein k is the catalytic activity for $C_5$ paraffin at a predetermined period of time after the initiation of the catalytic cyclization reaction, and $k_o$ is the catalytic activity for $C_5$ paraffin immediately (0 hr) after the initiation of the catalytic cyclization reaction.

The initial stage-specific activities of the upper part, middle part and lower part of the catalyst bed of the partially dealuminated zeolite catalyst and the coefficient of variation thereof are shown in Table 4, together with the reaction conditions of the partial dealumination of the zeolite catalyst, results of the catalytic cyclization reaction using the steamed catalyst, etc.

Comparative Example 2

A molded ZSM-5 zeolite catalyst was obtained by the same method as in step (1) of Example 1. In substantially the same manner as in step (2) of Example 1, steaming of the molded zeolite catalyst was conducted, except that the time and temperature for steaming in the first-stage of step (2) were changed, and the second-stage operation in step (2) was not conducted. Illustratively stated, in practicing the steaming in a first-stage of the method of the present invention, a fixed-bed, adiabatic type reactor was packed with the molded zeolite catalyst to form a catalyst bed, and the catalyst bed was heated to 640° C. under flowing nitrogen. A steam-nitrogen gas mixture containing 40% by volume of steam and having a pressure of 1 kg/cm²·G (in which the steam partial pressure is 0.8 kg/cm²) and a temperature of 640° C., was fed to and flowed through the reactor at a weight hourly space velocity (WHSV) of 0.08 hr$^{-1}$ for 1.5 hours. With respect to 21 equilength blocks of the catalyst bed which are arranged along the direction of steam flow, changes with time of the temperature of each of the blocks during the steaming were measured.

The activity of the steamed zeolite catalyst was then evaluated in substantially the same manner as in step (3) of Example 1.

Subsequently, the catalytic cyclization reaction of a feedstock comprising a $C_4$ fraction and a $C_5$ fraction in a weight ratio of 4:6 was effected using the above-obtained steamed catalyst by the same method as in step (4) of Example 2. The initial stage-specific activities of the partially dealuminated zeolite catalyst and the coefficient of variation thereof are shown in Table 4, together with the reaction conditions of the partial dealumination of the zeolite catalyst, results of the catalytic cyclization reaction using the steamed catalyst, etc.

Comparative Example 3

A molded ZSM-5 zeolite catalyst was obtained by the same method as in step (1) of Example 1. In substantially the same manner as in step (2) of Example 1, steaming of the molded zeolite catalyst was conducted, except that the time and temperature for steaming in the first-stage of step (2) were changed, and the second-stage operation of step (2) was not conducted. Illustratively stated, in practicing the steaming in a first-stage of the method of the present invention, a fixed-bed, adiabatic type reactor was packed with the molded zeolite catalyst to form a catalyst bed, and the catalyst bed was heated to 640° C. under flowing of nitrogen. A steam-nitrogen gas mixture containing 40% by volume of steam and having a pressure of 1 kg/cm²·G (in which the steam partial pressure is 0.8 kg/cm²) and a temperature of 640° C., was fed to and flowed through the reactor at a weight hourly space velocity (WHSV) of 0.08 hr$^{-1}$ for 5 hours. With respect to 21 equilength blocks of the catalyst bed which are arranged along the direction of steam flow, changes with time of the temperature of each of the blocks during the steaming were measured.

The activity of the steamed zeolite catalyst was then evaluated in substantially the same manner as in step (3) of Example 1.

Subsequently, the catalytic cyclization reaction of $C_4$ and $C_5$ fractions was effected using the above-obtained steamed catalyst by the same method as in step (4) of Example 2.

The initial stage-specific activities of the partially dealuminated zeolite catalyst and the coefficient of variation thereof are shown in Table 4, together with the reaction conditions of the partial dealumination of the zeolite catalyst, results of the catalytic cyclization reaction using the steamed catalyst, etc.

As is apparent from Table 1 and Table 4, when the steaming of a zeolite catalyst is conducted at a relatively high temperature as in Comparative Examples 2 and 3, the temperature of the catalyst bed becomes higher than 700° C., with that result that problems occur such that a special material which can stand such a high temperature needs to be used for the reactor. Further, when the steaming of a zeolite catalyst is conducted for a relatively long period of time as in Comparative Example 3, the average initial stage-specific activity of the partially dealuminated zeolite catalyst becomes low and, therefore, when the catalytic cyclization reaction of the $C_4$ and $C_5$ fractions is carried out using the partially dealuminated zeolite catalyst, the yield of $C_6$–$C_9$ aromatic hydrocarbons also becomes low. Further, as is seen from the comparison of Example 1 with Comparative Example 1 and the comparison of Example 2 with Comparative Example 2, when the value |cv(T)×1000| which is defined by the following formula:

$$cv(T) \times 1000$$

wherein cv(T) is the coefficient of variation of the time average temperature, which is defined by the formula:

$$cv(T) = s(T)/T$$

wherein T is the average temperature (°C.) of the catalyst bed, and s(T) is the standard deviation of the time average temperature, which is obtained from s(T)² which is the variance of the time average temperature and defined by the formula:

$$s(T)^2 = \sum_{i=1}^{21} (T_i - T)^2/21$$

$$T = \sum_{i=1}^{21} T_i/21$$

wherein $T_i$ is the time average temperature (°C.) of the i-th block of n equilength blocks of the catalyst bed, which are arranged along the direction of steam flow, exceeds 10, the coefficient of variation [cv(k)] of the initial stage-specific activity of the partially dealuminated zeolite catalyst which is defined by the following formula:

$$cv(k) = s(k)/k_{ave}$$

$$s(k)^2 = \sum_{i=1}^{21} (k_1 - k_{ave})^2/21$$

$$K_{ave} = \sum_{i=1}^{21} k_i/21$$

wherein s(k) is the standard deviation of the initial stage-specific activity, $k_{ave}$ is the average initial stage-specific activity, and s(k)² is the variance of the initial stage-specific activity, exceeds 0.1. Therefore, in each of Comparative Examples 1 and 2, the steaming cannot be uniformly conducted. In the upper part of the catalyst bed, the temperature becomes lower than that in the lower part of the catalyst bed, so that the catalytic activity remains too high, leading to a disadvantage that in the subsequent cyclization reaction using the steamed catalyst, the upper part of the catalyst bed undergoes vigorous coking. For example, the deterioration rate of the uppermost part of the catalyst bed in Comparative Example 2 is twice as high as that in Example 2, due to the coking.

TABLE 2

| Component | Composition [% by weight] |
|---|---|
| $C_3H_8$ | 0.1 |
| $C_3H_6$ | 0.6 |
| $C_4H_{10}$ | 24.5 |
| $C_4H_8$ | 74.2 |
| $C_5H_{12}$ | 0.4 |
| $C_5H_{10}$ | 0.2 |

TABLE 3

| Component | Composition [% by weight] |
|---|---|
| $C_3H_8$ | 0.0 |
| $C_3H_6$ | 0.0 |
| $C_4H_{10}$ | 0.9 |
| $C_4H_8$ | 0.0 |
| $C_5H_{12}$ | 72.0 |
| $C_5H_{10}$ | 27.1 |

TABLE 1

| | | | | Example 1 | Comparative Example 1 |
|---|---|---|---|---|---|
| Dealumi- nation | Reaction conditions | First- Stage | $T_0$: Temperature of fed steam [°C.] | 600 | 600 |
| | | | $T_2$: Maximum temperature of catalyst bed [°C.] | 650.7 | 654.4 |
| | | | Steam partial pressure [kg/cm²] | 0.8 | 0.8 |
| | | | Steaming time [min] | 10 | 60 |
| | | Second- Stage | $T_0$: Temperature of fed steam [°C.] | 640 | — |
| | | | $T_2$: Maximum temperature of catalyst bed [°C.] | 675.6 | — |
| | | | Steam partial pressure [kg/cm²] | 0.8 | — |
| | | | Steaming time [min] | 14 | — |
| | Average temperature of catalyst bed: T[°C.] | | | 660.5 | 643.8 |
| | Coefficient of variation of time average temperature of catalyst bed: CV(T) × 1000 | | | 4 | 21 |
| Results of conversion reaction of n-hexane | Initial stage-specific activity of upper part of catalyst bed (blocks 1–3) | | | 0.30 | 0.43 |
| | Initial stage-specific activity of middle part of catalyst bed (blocks 10–12) | | | 0.28 | 0.26 |
| | Initial stage-specific activity of lower part of catalyst bed (blocks 18–21) | | | 0.28 | 0.26 |
| | Average initial stage-specific activity of steamed catalyst bed | | | 0.29 | 0.29 |
| | Coefficient of variation of initial stage-specific activity of steamed catalyst bed | | | 0.03 | 0.21 |

TABLE 4

|  |  |  |  | Example 2 | Comparative Example 2 | Comparative Example 3 |
|---|---|---|---|---|---|---|
| Dealumi-nation | Reaction conditions | First-Stage | $T_0$: Temperature of fed steam [°C.] | 600 | 640 | 640 |
|  |  |  | $T_2$: Maximum temperature of catalyst bed [°C.] | 654.9 | 718 | 718 |
|  |  |  | $T_2 - T_0$ | 54.9 | 78 | 78 |
|  |  |  | Steam partial pressure [kg/cm$^2$] | 0.8 | 0.8 | 0.8 |
|  |  |  | Steaming time [min] | 60 | 90 | 300 |
|  |  | Second-Stage | $T_0$: Temperature of fed steam [°C.] | 640 | — | — |
|  |  |  | $T_2$: Maximum temperature of catalyst bed [°C.] | 667.4 | — | — |
|  |  |  | $T_2 - T_0$ | 27.4 | — | — |
|  |  |  | Steam partial pressure [kg/cm$^2$] | 0.8 | — | — |
|  |  |  | Steaming time [min] | 240 | — | — |
|  |  | Average temperature of catalyst bed: T[°C.] | | 647.7 | 681.5 | 657.6 |
|  |  | Coefficient of variation of time average temperature of catalyst bed: CV(T) × 1000 | | 9 | 24 | 15 |
| Results of conversion reaction of n-hexane | Initial stage-specific activity of upper part of catalyst bed (blocks 1–3) | | | 0.19 | 0.24 | 0.17 |
|  | Initial stage-specific activity of middle part of catalyst bed (blocks 10–12) | | | 0.16 | 0.14 | 0.14 |
|  | Initial stage-specific activity of lower part of catalyst bed (blocks 18–21) | | | 0.15 | 0.14 | 0.10 |
|  | Average initial stage-specific activity of steamed catalyst bed | | | 0.16 | 0.16 | 0.12 |
|  | Coefficient of variation of initial stage-specific activity of steamed catalyst bed | | | 0.08 | 0.22 | 0.12 |
|  | Yield of $C_6$–$C_9$ aromatic hydrocarbons [wt %] | | | 40.8 | 40.8 | 38.0 |
|  | Ratio of deterioration rate of uppermost part of catalyst bed | | | 1 | 2 | 1 |

Ratio of determination rate = $\dfrac{\text{Deterioration rate by coking in Comparative Example 2 or 3}}{\text{Deterioration rate by coking in Example 2}}$ Yield of $C_6$–$C_9$ aromatic hydocarbons: Yield which was obtained five hours after the initiation of the cyclization reaction of $C_4$ and $C_5$ fractions

INDUSTRIAL APPLICABILITY

According to the method of the present invention, even when the partial dealumination of a zeolite catalyst is conducted with steam having a relatively high temperature, the temperature difference can be rendered small over the entire catalyst bed and, therefore, by the method of the present invention, a partially dealuminated zeolite catalyst having a uniform activity can be obtained. Accordingly, in the subsequent reactions using the partially dealuminated zeolite catalyst, such as catalytic cyclization reactions, the lowering of the catalytic activity is extremely small, so that the stabilized activity can be maintained for a prolonged period of time. Thus, according to the method of the present invention, a partial dealumination of a zeolite catalyst exhibiting excellent, uniform catalytic performances can be stably performed on a commercial scale.

We claim:

1. A method for partially dealuminating a zeolite catalyst by steaming, which comprises the steps of charging a fixed-bed reactor with a zeolite catalyst comprising a zeolite belonging to the ZSM-5 family, having an Si/Al atomic ratio of from 2 to 60 in a zeolite structure thereof to provide a catalyst bed in said reactor; and feeding steam to and flowing said steam through said fixed-bed reactor to contact the zeolite catalyst of said catalyst bed with said steam for 0.1 to 50 hours under temperature distribution conditions which satisfy the following requirements (1) and (2);

(1) 500° C.$\leq T_0 \leq T \leq T_2 \leq$ 700° C. wherein $T_0$ is the temperature (°C.) of the fed steam;
$T_2$ is the maximum temperature (°C.) of the catalyst bed; and
T is the average temperature (°C.) of the catalyst bed, which is defined by the formula (1):

$$T = \sum_{i=1}^{n} T_i/n \quad (1)$$

wherein $T_i$ is the time average temperature (°C.) of the i-th block of n equilength blocks of the catalyst bed, which are arranged along the direction of steam flow; and (2) cv(T)×1000$\leq$10 wherein, cv(T) is the coefficient of variation of the time average temperature, which is defined by the formula:

$$cv(T) = s(T)/T$$

wherein, s(T) is the standard deviation of the time average temperature, which is obtained from s(T)$^2$ which is the variance of the time average temperature and defined by the formula:

$$s(T)^2 = \sum_{i=1}^{n} (T_i - T)^2/n,$$

wherein T and $T_i$ are as defined above, wherein said fixed-bed reactor has a scale such that, when said reactor is charged with said zeolite catalyst to provide a catalyst bed and a steam-nitrogen gas mixture containing 40% by volume of steam and having a pressure of 1 kg/cm$^2$·G and a temperature of 600° C. is fed to and flowed through said reactor at a weight hourly space velocity of 0.08 hr$^{-1}$ to effect steaming of the catalyst bed, said catalyst bed is caused, 60 minutes after the start of the feeding of said gas mixture, to have a temperature distribution wherein the catalyst bed has a portion at which the temperature is at least 10.6° C. higher than the average temperature of the catalyst bed which is the same as defined by the formula (1) above with the proviso that the time average temperature $T_i$ is as measured during the 60-minute steaming with respect to the i-th block of n equilength blocks of the catalyst bed, thereby producing a partially dealuminated zeolite catalyst having a stabilized activity in a fixed-bed reactor having said scale.

2. The method according to claim 1, wherein the flow of steam through said reactor to contact said zeolite catalyst with the steam is conducted in a sequence of the following steps (A) and (B):

(A) flowing steam having a steam partial pressure of at least 0.1 kg/cm$^2$ and a temperature of 500° to 650° C. through said reactor, to thereby contact said zeolite catalyst with the steam for 0.1 to 3 hours; and (B) temporarily stopping the flow of steam through said reactor and removing the steam which remains in said reactor, whereupon steam having a steam partial pressure of 0.1 to 10 kg/cm$^2$ and a temperature of 500° to 700° C. is flowed through said reactor, with the proviso that the temperature of the steam flowed in step (B) is higher than the temperature of the steam flowed in step (A), wherein said step (B) is performed at least once, so that the steam individually flowed in the or each step (B) is brought into contact with said zeolite catalyst which has been steamed in the step preceding the or each step (B).

3. The method according to claim 2, wherein said steam is flowed through said reactor at a weight hourly space velocity (WHSV) of 0.01 to 10 hr$^{-1}$.

4. The method according to claim 1, wherein the steam is flowed through said reactor at a weight hourly space velocity (WHSV) of 0.01 to 10 hr$^{-1}$.

5. The method according to claim 1, wherein said partially dealuminated zeolite catalyst has an initial stage-specific activity which satisfies the following formula:

Coefficient of variation of the initial stage-specific activity of all the partially dealuminated zeolite catalyst contained in the reactor ≦ 0.1 wherein the initial stage-specific activity of the partially dealuminated zeolite catalyst is defined as the ratio of the initial stage, first-order reaction rate constant of the decomposition of n-hexane catalyzed by the partially dealuminated zeolite catalyst relative to the initial stage, first-order reaction rate constant of the decomposition of n-hexane catalyzed by the zeolite catalyst prior to the steaming.

6. The method according to claim 5, wherein said zeolite catalyst prior to the steaming comprises a ZSM-5 zeolite.

7. The method according to claim 5, wherein the zeolite of said zeolite catalyst prior to the steaming has an Si/Al atomic ratio of at least 12 in a zeolite structure thereof, and has a sodium content of 500 ppm by weight or less.

8. The method according to claim 1, wherein said zeolite catalyst prior to the steaming comprises a mixture of said zeolite and at least one member selected from the group consisting of a metal belonging to Group VIII, Ib, IIb or IIIb of the Periodic Table and compounds thereof.

9. The method according to claim 8, wherein said zeolite catalyst prior to the steaming is a mixture of said zeolite and at least one member selected from the group consisting of zinc and compounds thereof.

10. The method according to claim 9, wherein said zeolite catalyst prior to the steaming comprises a mixture of said zeolite, at least one member selected from the group consisting of zinc and compounds thereof, and alumina.

11. The method according to claim 9, wherein said zeolite catalyst prior to the steaming comprises a mixture of said zeolite and a product obtained by heat-treating in steam a mixture of alumina and at least one member selected from the group consisting of zinc and compounds thereof.

12. The method according to claim 9, wherein said zeolite catalyst prior to the steaming comprises a mixture of said zeolite and zinc aluminate.

13. The method according to claim 9, wherein the content of said at least one member selected from the group consisting of zinc and compounds thereof in said zeolite catalyst prior to the steaming is 5 to 25% by weight in terms of the zinc.

14. The method according to any one of claims 1 to 13, wherein said zeolite of said zeolite catalyst prior to the steaming is substituted with a metal belonging to Group VIII, Ib, IIb or IIIb of the Periodic Table.

* * * * *